United States Patent
Yasni

(10) Patent No.: US 9,436,168 B2
(45) Date of Patent: Sep. 6, 2016

(54) SYSTEM AND METHOD FOR MAXIMISING THERMAL EFFICIENCY OF A POWER PLANT

(75) Inventor: Eli Yasni, Dunedin (NZ)

(73) Assignee: Exergy Limited, Avalon (NZ)

(*) Notice: Subject to any disclaimer, the term of this patent is extended or adjusted under 35 U.S.C. 154(b) by 805 days.

(21) Appl. No.: 13/508,719

(22) PCT Filed: Nov. 8, 2010

(86) PCT No.: PCT/NZ2010/000222
§ 371 (c)(1),
(2), (4) Date: Jun. 13, 2012

(87) PCT Pub. No.: WO2011/056081
PCT Pub. Date: May 12, 2011

(65) Prior Publication Data
US 2012/0283886 A1    Nov. 8, 2012
US 2013/0238149 A2    Sep. 12, 2013

Related U.S. Application Data

(60) Provisional application No. 61/259,516, filed on Nov. 9, 2009.

(51) Int. Cl.
*G05B 13/02*    (2006.01)
*G06F 1/26*     (2006.01)
(Continued)

(52) U.S. Cl.
CPC ............ *G05B 13/021* (2013.01); *F01K 13/02* (2013.01); *F22B 35/18* (2013.01); *Y02E 20/14* (2013.01); *Y02E 20/16* (2013.01)

(58) Field of Classification Search
USPC ......................................................... 700/287
See application file for complete search history.

(56) References Cited

U.S. PATENT DOCUMENTS 3,862,403 A    1/1975    Kurihara
4,577,270 A *  3/1986    Sugano et al. .......... 700/31
(Continued)

FOREIGN PATENT DOCUMENTS

JP    58040603    3/1983
JP    58040604    3/1983
(Continued)

OTHER PUBLICATIONS

Australian Patent Office, "Declaration of Non-Establishment of International Search Report", mailed Feb. 10, 2011, for International Application No. PCT/NZ2010/000222, 1 page.

(Continued)

*Primary Examiner* — Mohammad Ali
*Assistant Examiner* — John Park
(74) *Attorney, Agent, or Firm* — Ellen M. Bierman; Lowe Graham Jones PLLC

(57) ABSTRACT

A method for maximizing thermal efficiency of a power plant, the method comprising obtaining the current state of the plant from available measured data; obtaining a set of Variables representing a current state of the power plant; applying a set of constraints to the Variables; generating a revised set of Variables representing a revised state of the power plant; and testing the revised set of Variables within a mathematical model for convergence. Generating the revised set of Variable is based at least partly on: Euler's equation, the conservation of mass equation, and a mathematical description of a reversible continuum. There are also provided a related power plant thermal efficiency maximization system and computer program.

6 Claims, 5 Drawing Sheets

(51) Int. Cl.
*F01K 13/02* (2006.01)
*F22B 35/18* (2006.01)

(56) References Cited

U.S. PATENT DOCUMENTS

| | | | |
|---|---|---|---|
| 5,841,652 A | 11/1998 | Sanchez | |
| 5,873,251 A * | 2/1999 | Iino | 60/660 |
| 6,681,155 B1 * | 1/2004 | Fujita et al. | 700/287 |
| 6,868,368 B1 | 3/2005 | Lang | |
| 8,620,482 B2 * | 12/2013 | Muller | 700/286 |
| 2007/0104306 A1 * | 5/2007 | Umezawa et al. | 376/317 |
| 2009/0012653 A1 * | 1/2009 | Cheng | F23N 5/242 |
| | | | 700/287 |

FOREIGN PATENT DOCUMENTS

| | | |
|---|---|---|
| JP | 58040605 | 3/1983 |
| JP | 58040606 | 3/1983 |
| JP | 58040607 | 3/1983 |
| JP | 58040608 | 3/1983 |
| JP | 58040609 | 3/1983 |
| JP | 58040610 | 3/1983 |
| JP | 58040611 | 3/1983 |
| JP | 58040612 | 3/1983 |
| JP | 58040613 | 3/1983 |
| JP | 58040614 | 3/1983 |
| JP | 58040615 | 3/1983 |
| JP | 58040616 | 3/1983 |
| WO | 2006086175 A2 | 8/2006 |

OTHER PUBLICATIONS

Australian Patent Office, "Written Opinion of the International Searching Authority", mailed Feb. 10, 2011, for International Application No. PCT/NZ2010/000222, 4 pages.

Australian Patent Office, "Written Opinion of the International Preliminary Examining Authority", mailed Sep. 7, 2011, for International Application No. PCT/NZ2010/000222, 4 pages.

Australian Patent Office, "International Preliminary Report on Patentability", completed Jan. 11, 2012, for International Application No. PCT/NZ2010/000222, 10 pages.

M Morini et al.; Development of a One-Dimensional Modular Dynamic Model for the Simulation of Surge in Compression Systems; Journal of Turbomachinery; vol. 129; ASME Turbo Expo 2006: Land, Sea and Air (GT2006), Barcelona, Spain, May 8-11, 2006; Paper No. GT2006-90134; pp. 437-447; 11 pages.

Manu Parashar; Continuum Modeling of Electromechanical Dynamics in Large-Scale Power Systems; IEEE Transactions on Circuits and Systems-I: Regular Papers; vol. 51; No. 9; Sep. 2004; pp. 1848-1858; 11 pages.

E. Yasni; A Convenient Truth: How to Significantly Improve Thermal Efficiency at No Cost; Oct. 17, 2008; 15 pages.

* cited by examiner

SYSTEM AND METHOD FOR MAXIMISING THERMAL EFFICIENCY OF A POWER PLANT

CROSS-REFERENCE SECTION

This application claims the benefit of International Application No. PCT/NZ2010/000222, filed Nov. 8, 2010, and entitled "SYSTEM AND METHOD FOR MAXIMISING THERMAL EFFICIENCY OF A POWER PLANT", which claims the benefit of U.S. Provisional Patent Application No. 61/259,516, filed Nov. 9, 2009, and entitled "SYSTEM AND METHOD FOR MAXIMIZING THERMAL EFFICIENCY OF A POWER PLANT," which are hereby incorporated by reference in their entireties.

BACKGROUND

Experience shows that significant efficiency increase due to real time tuning of thermal power-plants is feasible. It would be helpful to provide a system that systematically yields the absolute maximum of thermal efficiency η of a plant with respect to a set of independent measured parameters. The parameters, also referred to as Variables, are preferably available to an operator or an engineer to manipulate, subject to operational, safety, structural, and environmental constraints. The technique would ideally be applicable to any type of energy-conversion plant in particular thermal power plants. Thermal power plants include, but are not restricted to steam-turbine, combined cycle, co-generation power-plants, Diesel cycles, and nuclear.

It is an object of the invention to go some way toward maximising thermal efficiency of a power plant, or to at least provide the public with a useful choice.

SUMMARY OF INVENTION

In one embodiment the invention comprises a method for maximising thermal efficiency of a power plant, the method comprising:
  obtaining the current state of the plant from available measured data;
  obtaining a set of Variables representing a current state of the power plant,
  applying a set of constraints to the Variables;
  generating a revised set of Variables representing a revised state of the power plant, the generation based at least partly on:
    Euler's equation $$\rho \frac{\partial \vec{v}}{\partial t} = \frac{\partial (\rho \vec{v})}{\partial t} + \rho (\vec{v} \cdot \nabla) \vec{v} = -\nabla P - \sum \vec{F}_k \cdot \vec{j}_k;$$

and
    the conservation of mass equation $$\frac{\partial (A \rho_k)}{\partial t} + \nabla \cdot [A(\vec{j}_k + \rho_k \vec{v})] = \frac{\partial}{\partial t}\left[ A \times M_k \sum_{j=1}^{r} v_{kj}(\rho \tilde{n}_j) \right];$$

a mathematical description of a reversible continuum; and
    testing the revised set of Variables within a mathematical model for convergence.

Preferably the mathematical description of the reversible continuum comprises:
  the reversible conservation of energy equation $$\frac{\partial}{\partial t}\left(\rho \frac{1}{2}\vec{v}^2 + \psi\right) + \nabla \cdot \left(\rho \frac{1}{2}\vec{v}^2 + \psi\right) + \left(\sum_{j=1}^{R}\sum_{k=1}^{K} \mu_k v_{kj} J_j - \rho \dot{Q}\right) =$$
$$-\left(\sum \mu_k \frac{\partial \rho c_k}{\partial t} + \nabla \cdot \rho(h-Ts)\vec{v} - \nabla \cdot \sum \mu_k \vec{j}_k\right);$$

the thermodynamic equations of state $$\rho = \rho(P,T,c_k), h - Ts = g = g(P,T,c_k), \mu_k = \mu_k(P,T,c_k), k=1\ldots N$$

Preferably the mathematical description of the reversible continuum comprises the geodesic equation $$\frac{\partial \dot{R}^k}{\partial R^j}\dot{R}^j + \begin{Bmatrix} k \\ ij \end{Bmatrix} \dot{R}^i \dot{R}^j = 0; \frac{dR^k}{dt} = \dot{R}^k.$$

Preferably the method further comprises repeating the steps of generating the revised set of Variables and testing the revised set of Variables within the mathematical model until each of the revised set of Variables reaches a variance less than a threshold variance.

Preferably generating the revised set of variables is based at least partly on the equation $$\frac{1}{A}\frac{dA}{dx} = \frac{1}{\rho u^2}\frac{dP}{dx}\left(1 - u^2 \frac{\partial \rho}{\partial P}\right) = \frac{1}{\rho u^2}\frac{dP}{dx}(1 - Ma^2).$$

Preferably generating the revised set of variables is based at least partly on the equation $$\frac{\partial (A\rho_k u + j_k)}{\partial x} = \frac{\partial}{\partial t}\left[A \times M_k \sum_{j=1}^{r} v_{kj}(\rho \tilde{n}_j)\right].$$

Preferably generating the revised set of variables is based at least partly on the equation $$\frac{\partial}{\partial x}\left(\rho \frac{1}{2}u^2 + \psi\right) + \left(\sum_{j=1}^{R}\sum_{k=1}^{K} \mu_k v_{kj} J_j - \rho \dot{Q}\right) = -\left[\frac{\partial}{\partial x}(\rho(h-Ts)u - \sum \mu_k j_k)\right]$$

Preferably testing the revised set of variables for convergence includes:
  calculating the kinetic energy of each reversible continuum of the power plant at an initial state Aent;
  calculating the kinetic energy of each reversible continuum of the power plant at a subsequent state Aex; and
  calculating the difference between the kinetic energy at Aex and the kinetic energy at Aent.

Preferably testing the revised set of variables for convergence includes minimizing the sum of individual calculated differences between the kinetic energy at Aex and the kinetic energy at Aent.

Preferably one or more of the calculated differences is determined by the normalized equation $$\dot{W}_{rev} = \sum \int_{P(-1)}^{P(1)} \frac{1}{\rho} dP \int_{-1}^{1} A\rho u \frac{1}{2} u^2 \, dx$$

In a further embodiment the invention comprises a computer readable medium on which is stored computer executable instructions that when executed by a processor cause the processor to perform any one of the above methods.

In a further embodiment the invention comprises a power plant thermal efficiency maximisation system comprising:
- a minimiser configured to apply a set of constraints to a set of Variables, the Variables representing a current state of a power plant;
- a solver configured to generate a revised set of Variables representing a revised state of the power plant, the generation based at least partly on:
  Euler's equation $$\rho \frac{\partial \vec{v}}{\partial t} = \frac{\partial (\rho \vec{v})}{\partial t} + \rho(\vec{v} \cdot \nabla)\vec{v} = -\nabla P - \sum \vec{F}_k \cdot \vec{j}_k;$$

and
the conservation of mass equation $$\frac{\partial (A\rho_k)}{\partial t} + \nabla \cdot [A(\vec{j}_k + \rho_k \vec{v})] = \frac{\partial}{\partial t}\left[A \times M_k \sum_{j=1}^{r} v_{kj}(\rho \tilde{n}_j)\right];$$

a mathematical description of a reversible continuum; and
a convergence tester configured to test the revised set of Variables for convergence.

Preferably the mathematical description of the reversible continuum comprises:
the reversible conservation of energy equation $$\frac{\partial}{\partial t}\left(\rho \frac{1}{2}\vec{v}^2 + \psi\right) + \nabla \cdot \left(\rho \frac{1}{2}\vec{v}^2 + \psi\right) + \left(\sum_{j=1}^{R}\sum_{k=1}^{K} \mu_k v_{kj} J_j - \rho \dot{Q}\right) =$$
$$-\left(\sum \mu_k \frac{\partial \rho c_k}{\partial t} + \nabla \cdot \rho(h - Ts)\vec{v} - \nabla \cdot \sum \mu_k \vec{j}_k\right);$$

the thermodynamic equations of state $$\rho = \rho(P,T,c_k), h - Ts = g = g(P,T,c_k), \mu_k = \mu_k(P,T,c_k), k = 1 \ldots N$$

Preferably the mathematical description of the reversible continuum comprises the geodesic equations $$\frac{\partial \dot{R}^k}{\partial R^j}\dot{R}^j + \begin{Bmatrix} k \\ ij \end{Bmatrix}\dot{R}^i \dot{R}^j = 0; \frac{dR^k}{dt} = \dot{R}^k.$$

Preferably the solver is configured to repeat the steps of generating the revised set of Variables and testing the revised set of Variables within the mathematical model until each of the revised set of Variables reaches a variance less than a threshold variance.

Preferably generating the revised set of variables is based at least partly on the equation $$\frac{1}{A}\frac{dA}{dx} = \frac{1}{\rho u^2}\frac{dP}{dx}\left(1 - u^2 \frac{\partial \rho}{\partial P}\right) = \frac{1}{\rho u^2}\frac{dP}{dx}(1 - Ma^2).$$

Preferably generating the revised set of variables is based at least partly on the equation $$\frac{\partial (A\rho_k u + j_k)}{\partial x} = \frac{\partial}{\partial t}\left[A \times M_k \sum_{j=1}^{r} v_{kj}(\rho \tilde{n}_j)\right].$$

Preferably generating the revised set of variables is based at least partly on the equation $$\frac{\partial}{\partial x}\left(\rho \frac{1}{2}u^2 + \psi\right) + \left(\sum_{j=1}^{R}\sum_{k=1}^{K} \mu_k v_{kj} J_j - \rho \dot{Q}\right) = -\left[\frac{\partial}{\partial x}(\rho(h - Ts)u - \sum \mu_k j_k)\right]$$

Preferably the convergence tester is configured to test the revised set of variables for convergence, including:
- calculating the kinetic energy of each reversible continuum of the power plant at an initial state Aent;
- calculating the kinetic energy of each reversible continuum of the power plant at a subsequent state Aex; and
- calculating the difference between the kinetic energy at Aex and the kinetic energy at Aent.

Preferably testing the revised set of variables for convergence includes minimizing the sum of individual calculated differences between the kinetic energy at Aex and the kinetic energy at Aent.

Preferably one or more of the calculated differences is determined by the normalized equation $$\dot{W}_{rev} = \sum \int_{P(-1)}^{P(1)} \frac{1}{\rho} dP = \int_{-1}^{1} A\rho u \frac{1}{2} u^2 \, dx.$$

The term 'comprising' as used in this specification and claims means 'consisting at least in part of', that is to say when interpreting statements in this specification and claims which include that term, the features, prefaced by that term in each statement, all need to be present but other features can also be present. Related terms such as 'comprise' and 'comprised' are to be interpreted in similar manner.

As used herein the term "and/or" means "and" or "or", or both.

As used herein "(s)" following a noun means the plural and/or singular forms of the noun.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

In this description the following definitions are used:
A surface area
$A_{entex}$ the surface area across which matter enters and exits the control-volume
B,b exergy, specific exergy
$C_k$ concentration of chemical species k $\{_{\alpha\beta}{}^{\gamma}\}$ Christoffel Symbols
H, $H_f$, h enthalpy, enthalpy of formation, specific enthalpy
$\vec{J}_k$ diffusion vector of chemical species k
$J_j$ rate of chemical reaction j
$\vec{n}$ unit vector normal to the surface
P pressure
$\dot{Q}$ magnitude of heat interaction per volume
S,s entropy, specific entropy
$R^i$ general notation for intensive properties $R^1$=T, etc.
T absolute temperature
t time
u velocity in the x direction
V volume
$\vec{v}$ velocity vector
$\dot{W}$ the rate of shaft work output (shaft power output), $\eta$ thermal efficiency
$\rho$ density
$\vec{\vec{\sigma}}$ stress tensor
$\vec{\vec{\tau}} = \tau_{ij} = \sigma_{ij} \forall i \neq j$
$\rho_k$ density of species k
$\psi$ specific potential energy
$\mu$ chemical potential $\mu_k$ chemical potential of species k

BRIEF DESCRIPTION OF THE FIGURES

The present invention will now be described with reference to the accompanying drawings in which.

DETAILED DESCRIPTION OF PREFERRED FORMS

Thermal efficiency of a power-plant $\eta$ is defined as $$\eta = \frac{\dot{W}}{\dot{H}} = \frac{\dot{W}}{\dot{H}_l + \dot{H}^i} = \frac{\dot{W}}{\dot{m}_f h_f + \dot{H}^i} = \frac{\dot{W}}{\dot{m}_f Cv + \dot{H}^i} \quad (1)$$

where $\dot{W}$ is the rate of shaft work output (shaft power output), $\dot{H}_f$ is the rate of fuel energy input, $\dot{H}^i$ is the rate of other energy inputs, $h_f$ is fuel specific enthalpy which is the same as fuel calorific value Cv, $\dot{m}_f$ is fuel mass-flow rate; $\eta$ is measured in %.

For turbine plants the inverse $$HRT = \frac{1}{\eta}$$

called heat-rate is used; the units of HRT are Kwh/Kj or Kj/Kj.

The techniques maximize $\eta$ (minimize HRT) with respect to a set of independent measured parameters called Variables. The Variables are available to an operator or an engineer to manipulate subject to operational, safety, and structural constraints. In addition to these structural constraints there are external constraints like the environment. The Variables are independent in the sense that one or more can be varied without affecting the others. If the load $\dot{W}$ and Cv, $\dot{H}^i$ are externally dictated, then $\dot{m}_f$ is to be minimized; however, one can invert this to a dictated $\dot{H}_f$, $\dot{H}^i$ then $\dot{W}$ is to be maximised.

It is intended that the technology below apply to both scenarios.

It is well known that max($\eta$) is equivalent to min ($T_0 \Delta\dot{S}$) where $\Delta\dot{S}$ is the total rate of entropy production, $T_0$ is the temperature of the sink, normally the environment (atmosphere, ocean) and $T_0 \Delta\dot{S}$ is total plant's exergy-loss. A given $T_0$ is an example of an environmental constraint. The techniques below do not require that $T_0$ be fixed. Rather the related quantity of reversible work is used.

Figure 1:
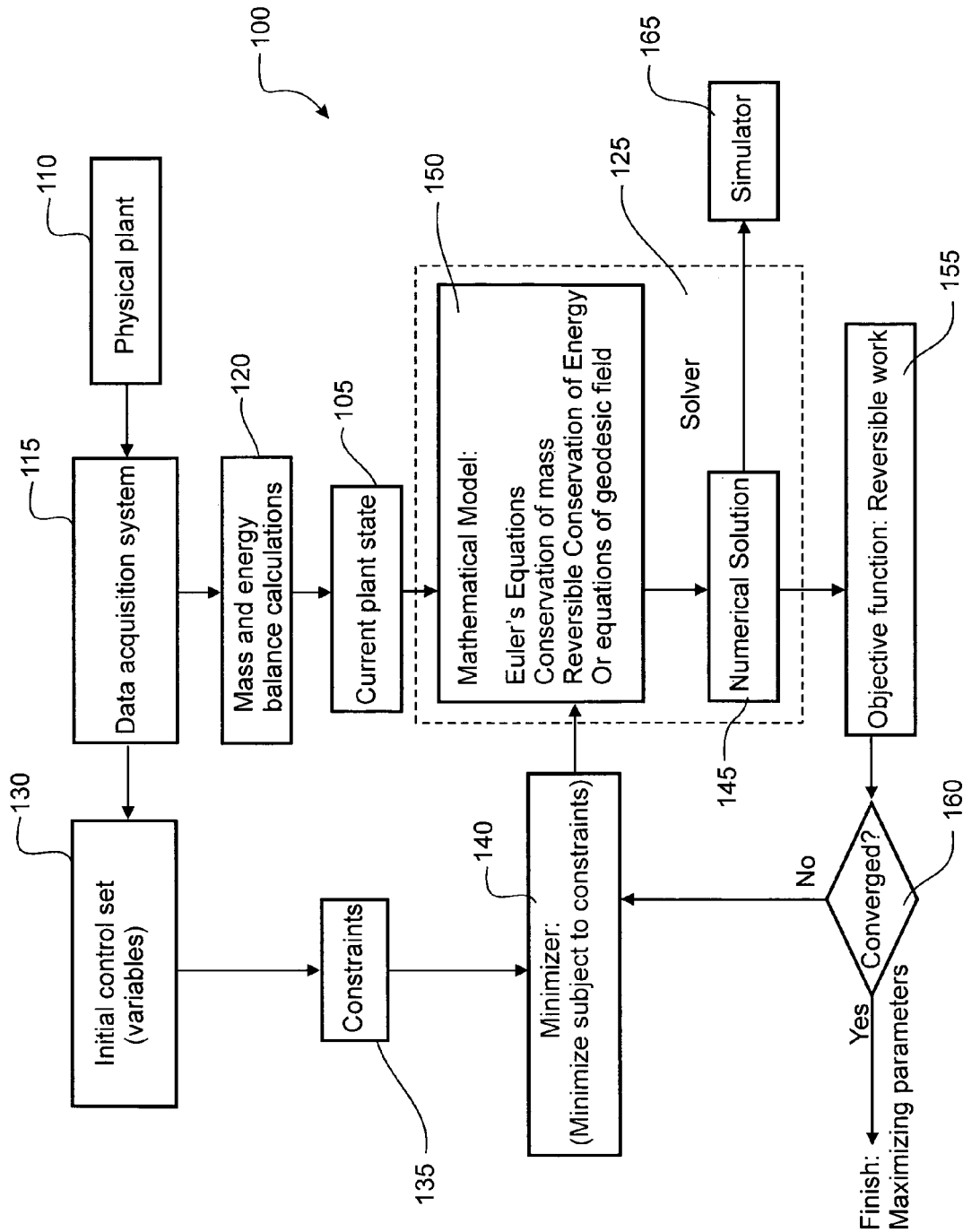
FIG. 1 shows a preferred form technique for maximising thermal efficiency.

FIG. 1 shows a preferred form technique for maximising thermal efficiency. The system 100 operates iteratively. It takes as input the current actual state 105 of a physical power plant 100. A data acquisition system 115 obtains available measured data. Conventional mass and energy balance calculations are carried out 120. The intention is that substantially every meaningful cross-section of the mass flow rate, temperature, pressure and chemical composition are known. In this way the current state of the plant is obtained from available measured data. The actual state of the plant constitutes all relevant thermodynamic properties throughout the plant. It is fed to the Solver 125 at the start of the first iteration. The initial control set or Variables 130 include temperatures, pressures and flows. These are typically determined by the user, who decides what the variables should be. The settings of each variable are subject to constraints 135. These constraints 135 are sent to a minimizer 140 and then to Solver 125.

The Solver 125 outputs a numerical solution 145 at least partly from a mathematical model 150. The Solver 125 is used to generate the value of an objective function 155 which is then tested against a convergence criterion by a convergence tester 160. The tester 160 determines whether the values of the objective function 155 at the (current) jth iteration are "sufficiently close" to its value at jth−1 iteration. If yes then the criterion is satisfied and the Algorithm displays the Variables' values that maximise the plant's efficiency. Otherwise these are fed back into the minimizer 140 which feeds the jth set of Variables into the Solver 125. Solver 125 then feeds the jth numerical 145 solution into the objective function 155 and the process is repeated.

The final values of the Variables generated by the system 100 can also be fed to the plant's control system and so render the maximizing of $\eta$ fully automatic.

System 100 further includes a simulator 165. One can show that the numerical solution given by the Solver 125 at any iteration, say the jth, corresponds to an actual state of the plant dictated by the jth set of the Variables. The Variables are the only plant parameters that can be varied independently. Hence one can tabulate the plant's actual states against all the combinations of Variables generated by the minimizer 140 (this is of course, a multi-dimensional table). Furthermore one can take the minimizer 140 out of the loop, and generate the said table for any number of arbitrary combinations of the Variables. Either way, for any set of values of the Variables the table yields the corresponding plant's actual state. Such a table is a simulator by conventional definition. It makes a prediction of the state of the plant if one changes the value of the Variable(s).

A plant, no matter how complex, constitutes a finite number of continuities separated by boundaries also know as discontinuities. Such a system is called semi-continuous. In a power plant these continuities are flows of the working fluids governed by the laws of Fluid-Mechanics. The most fundamental of these are the balances of momentum, mass, energy entropy, and electrical charge. The last of these is irrelevant to the techniques described below. These balances can be written both in integral and differential forms. The differential balance equations for mass and energy and momentum can always be written in a divergent form which renders them Conservation Laws. The name comes from the fact because of the divergent the integral form of the said balance is a vanishing surface integral. This can be put more simply as "what goes in goes out." Because of its importance to what follows consider for example the general balance of momentum:

$$\rho \frac{d\vec{v}}{dt} = \frac{\partial \rho \vec{v}}{\partial t} + \nabla \cdot (\rho \vec{v}\vec{v}) = \nabla \cdot \vec{\sigma} - \sum \vec{F}_k \cdot \vec{j}_k \quad (2)$$

The above mentioned system of partial differential equations (PDEs) is undetermined. Constituent (or phenomenological) equations complement these PDEs. The fundamental constitutent coefficients and the symmetries they obey are already known. The numerical values of the phenomenological coefficients are not normally known; for the most important ones there are tabulated empirical values which are by no means standards. Whichever the method, the assumption that the phenomenological coefficients even exist, is enabled by a balance of entropy equation which is not a conservation law.

Balance of entropy can be reduced to a conservation law only for reversible flows. For such a fluid the rate of entropy production is zero, ie it satisfies:

$$\nabla\left(\frac{1}{T}\right) \cdot \vec{Q} = 0, \ \frac{1}{T}\vec{\vec{T}} : \nabla \vec{v} = 0, \ \sum_k \left(\frac{F_k}{T} - \nabla \frac{\mu_k}{T}\right) \cdot \vec{j}_k = 0 \quad (3)$$

For a reversible fluid the phenomenological coefficients all vanish. A fluid for which $\vec{\sigma} = 0$ is known as a perfect fluid. For a perfect fluid the balance of momentum equation reduces to Euler's equation of motion. It is well known that even under the assumption of perfect fluid the set of Euler's equations and conservation of mass are underdetermined in the 3 components of the velocity field, pressure field, and density field. Hence for various applications some other assumptions are added to well-pose the system of PDEs. The best known are isentropic or isothermal flow, or some truncated equation of state. The term $\rho = \rho(P)$ is one of the most commonly used.

Referring to FIG. 1 the mathematical model 150 comprises Euler's equation, conservation of mass and either the equation of Thermodynamic Geodesic Field (TGF) in the thermodynamic metric, or a direct Reversible Energy Conservation (REC) equation. This mathematical model accurately represents a reversible flow. Either TGF or REC can be used. The two equations TGF and REC are equivalent for the techniques described here. Other equations which are best described as different flavours of REC or TGF can also be used. The numerical solution of the mathematical model 150 is an accurate state of a reversible equivalent of the actual plant. The power output of the reversible equivalent is the maximum possible, subject to the given thermodynamic boundary conditions of the plant. The actual power is dictated as a constraint. The intention is to minimize the reversible power by manipulating the Variables, because the loss is simply the reversible power minus the actual power.

The simulator 165 tabulates the numerical outputs of the Solver 125 for different sets of Variables. These tables correspond to predictions of the state of the actual plant. This is surprising, since the many models of continuous fluid-flow all call upon Navier-Stokes equations (also a balance of momentum), which depend upon 2 empirical phenomenological coefficients, and the solving of which involves further ad-hoc assumptions. These equations are heavy on computer resources, may not even be solvable, or are very difficult to integrate for an entire plant, which is the main reason why there is no efficiency maximize for a power plant at present.

The techniques also claim to accurately predict actual parameters of the continuum through the mathematical model of the reversible flow, but only at the terminals (ie at Aent, Aex) of the continuum. This is the price paid for the simplification. However these are the only ones where properties are measurable by power-plant engineers.

Consider a steam-turbine as a subprocess of a power plant. It can be described as a single continuum. The ordered pair which is the Clausius notion of a process, are the states on steam entering and existing cross-sections (Aentex) of the turbine.

The maximum possible magnitude of work interaction subject to the given end states is delivered by a reversible process which can be an isentropic turbine, diverting part of its power to drive a Carnot heat-pump, which in turn maintains the Aentex (end) states of the actual turbine by drawing heat from reservoirs (the environment).

The total rate of entropy production of the isentropic turbine, the Carnot heat-pump and reservoirs is zero; hence the process is reversible. In other words the actual turbine is replaced by an isentropic one plus a Carnot heat-pump which is compensated to maintain the Aent, Aex thermodynamic states.

These techniques apply the said principle to a continuum. The general statement is that for every given (irreversible) continuum there exists a reversible continuum which delivers maximum work, such that values of the thermodynamic properties at the boundary of the original continuum are maintained. Such a substitution of a reversible continuum for an actual irreversible continuum is referred to here as Reversible Masking.

These techniques establish that the converse is also true, that is, one can recover the original continuum from the reversible one. It is the inversion from predicted reversible to predicted actual, which enables the function of simulator 165.

Mathematical model 150 does not require any prior knowledge of plant's dimensions, or any other (plant component's) characteristics, or any empirical tabulated data save thermodynamic properties h,s,v, of the working fluids. The model is also free of ad-hoc assumption, hence its accuracy. The same mathematical model can be used as a stand-alone to predict variations of the plant parameters other than maximum work, both for dynamics and steady-state.

The model has the potential to be fast, light on computer resources, and universal. The key to the success of the mathematical model lies with an augmentation to Euler's balance-of-momentum equations as presented below.

This augmentation is an energy conservation equation for a reversible process (REC) without reference to external systems like the environment. The techniques described below include a number of such augmenting equations, all equivalent.

The full, well-posed system of PDEs is set out below. For a reversible flow the shear stress components $\tau_{ij}$ are zero hence equation (2) reduces to the Euler equation.

$$\rho \frac{d\vec{v}}{dt} = \frac{\partial(\rho\vec{v})}{\partial t} + \rho(\vec{v} \cdot \nabla)\vec{v} = -\nabla P - \sum \vec{F}_k \cdot \vec{j}_k \quad (4)$$

Conservation of mass of a continuum subject to a variable cross section area $$\frac{\partial(A\rho_k)}{\partial t} + \nabla \cdot \left[A(\vec{j}_k + \rho_k \vec{v})\right] = \frac{\partial}{\partial t}\left[A \times M_k \sum_{j=1}^{r} v_{kj}(\rho \tilde{n}_j)\right] \quad (5)$$

In the above equation:
$M_k$ is the mass of species k,
$\vec{J}_k = \rho_k \vec{v}$ is the diffusion flux of species k, and
$\tilde{n}_j$ is the number of Kmoles of chemical reaction j per Kg of total mass.
The rate of chemical reaction j is $$J_j = \frac{\partial(\rho \tilde{n}_j)}{\partial t}.$$

Conservation of energy for a reversible flow (REC) equation.

$$\frac{\partial}{\partial t}\left(\rho \frac{1}{2}\vec{v}^2 + \psi\right) + \nabla \cdot \left(\rho \frac{1}{2}\vec{v}^2 + \psi\right) + \left(\sum_{j=1}^{R}\sum_{k=1}^{K} \mu_k v_{kj} J_j - \rho \dot{Q}\right) = \quad (6)$$

$$-\left(\sum \mu_k \frac{\partial \rho c_k}{\partial t} + \nabla \cdot \rho(h - Ts)\vec{v} - \nabla \cdot \sum \mu_k \vec{j}_k\right)$$

In addition there are the thermodynamic equations of state $$\rho = \rho(P,T,c_k), h - Ts = g = g(P,T,c_k), \mu_k = \mu_k(P,T,c_k), k = 1 \ldots N$$

For the system to be well-posed the number of unknown functions must equal the number of differential equations. The unknown functions are the 3 components of the velocity $\vec{v}$, the density $\rho$, the Gibbs function g, the pressure P, the temperature T, altogether 7 unknowns. Plus the N densities $\rho_k$, the N chemical potentials $\mu_k$, altogether 2N+7 unknowns. There are 3 Euler conservation of momentum equations, 1 equation of reversible conservation of energy, N equations of conservation of mass, N equations of state $\mu_k = \mu_k(P,T,p_j)$, 2 equations of state $g = g(P,T,\rho_j), \rho = \rho(P,T,\rho_j)$, and $$\rho = \sum_k \rho_k.$$

Altogether 3+1+2N+2+1=2N+7. Discussion is initially limited to 2 spatial dimensions x,y and time t (2d+1), that is, the unknown functions do not vary in the z direction. Given the distribution of the cross-sectional area A(x,y,t), and the initial (at time $t = t_0$) values of the unknown functions on a region $f(x(t_0), y(t_0), t_0) = 0$ on the spatial x-y plane, then the set of equations (4) to (6) is well posed and can be solved yielding the spatial distribution of the unknown functions at any time t i.e. the values of $\vec{v}(x, y, t)$, P(x, y, t), T(x, y, t), $\rho_k(x, y, t)$, $\mu_k(x, y, t)$, $\rho(x, y, t)$, g(x, y, t) for all x,y,t varying between predetermined limits. The cross-sectional area A is such that the spatial vector $\vec{n}$ normal to A lies on the spatial x,y,t∀x,y, t plane. In other words the A intersects the x-y plane along a curve that can be of any shape. If the said intersecting curve is a straight line perpendicular to the x axis everywhere, then the flow is 1d+1. This is known as cylindrically symmetric.

Alternatively, one can replace the 3 equations of the conservation of momentum (Euler) by the geodesic equations (TGF) in the spatial coordinates (the summation convention applies)

$$\frac{\partial v^\gamma}{\partial q^\beta}v^\beta + \left\{\begin{array}{c}\gamma\\\alpha, \beta\end{array}\right\}v^\alpha v^\beta = 0 \quad (7)$$

where the q coordinates are in the Galilean 2+1 space, and the Christoffel Symbols are in an induced metric. This induced metric is described in Weinhold F. 1975 *Metric Getway of Equilibrium Thermodynamics* (followed by II,III, IV,V) Journal of Chemical Physics 63: 2479-2483. It is referred to as the Weinhold metric. This metric is not commonly known hence it is rather preferable to replace the N equations of conservation of mass plus the equation of reversible conservation of energy plus the equation of state $g = g(P,T,c_k)$ by N+2 geodesics equations in the thermodynamic coordinates, in this case P, T, $\rho_k$, here the Christoffel Symbols are in the Weinhold metric which can be derived from standard thermodynamic properties functions and the knowledge of the chemical reaction $$\frac{\partial \dot{R}^k}{\partial R^j}\dot{R}^j + \left\{\begin{array}{c}k\\ij\end{array}\right\}\dot{R}^i \dot{R}^j = 0; \frac{dR^k}{dt} = \dot{R}^k \quad (8)$$

Strictly speaking equations (4,5,6,8) are (2N+2)×2 equations with the additional 2N+2 variables $\dot{R}^k$.

Equation (8) is equivalent to the $2^{nd}$ order system in the parameter t:

$$\frac{d^2 R^i}{dt^2} + \left\{\begin{array}{c}i\\jk\end{array}\right\}\frac{dR^j}{dt}\frac{dR^k}{dt} = 0 \quad (9)$$

$$R^1 = T, R^2 = P, R^3 = \rho(1), R^4 = \rho(2) \ldots R^{N+2} = \rho(N)$$

$$R^i(t = 0) = R^i_0, R^i(t = t_2) = R^i_2, \rho_2 = \rho(T, T, (P))$$

Clearly equation (8) is an augmentation to Euler's equations replacing both energy and mass conservation equations. The solutions are in fact the same. The left hand side structure of both equations is the same i.e. the covariant derivative of the velocity $\vec{v}$, however in different metrics. Even though the right hand sides differ the solution is still the same. Either way, the solution is valid only for reversible flows. Described below is how this applies to real irreversible flows.

A plant is commissioned with measuring instruments such that it is possible to compute all stationary-state relevant mass-flow-rates by integral energy and mass balances alone. This is so because the efficiency monitoring is most important for stationary-state which is where a power plant normally is. To minimize the cost of instrumentation, manufacturers arrange measuring instruments across the power plant such that the basic continuums assume cylindrical symmetry, hence are in effect one-dimensional. For example there is normally one thermometer at a turbine inlet main stream pipe and one at its exhaust, implicitly assuming that this single thermometer(s) represent the cross-sectional temperature distribution.

If the actual continuum is in one-dimensional stationary-state then so is its Reversible Masking, that is, all $$\frac{\partial}{\partial t}$$

of equations (4) to (6) vanish, and velocities and other properties vary only in the x-direction. Hence the reversible conservation PDEs can be reduced to ODEs, or even be reduced further to algebraic equations. The time independent 1d balance of momentum $$\frac{\partial(\rho u u)}{\partial x} -= \frac{\partial P}{\partial x} - \sum \vec{F}_k \cdot \vec{J}_k \Rightarrow u\frac{\partial u}{\partial x} = -\rho^{-1}\frac{\partial P}{\partial x} - \sum \vec{F}_k \cdot \vec{J}_k \quad (10)$$

For 1d stationary-state it is more convenient to work with the "diffuser-nozzle theory"

$$\frac{dA}{A} = \frac{dP}{\rho u^2} - \frac{d\rho}{\rho} = \frac{dP}{\rho u^2}\left(1 - u^2 \frac{\partial \rho}{\partial P}\right) = \frac{dP}{\rho u^2}(1 - Ma^2) \quad (11)$$

where Ma is the Mach number. Writing this in one-dimension in the direction of x $$\frac{1}{A}\frac{dA}{dx} = \frac{1}{\rho u^2}\frac{dP}{dx}\left(1 - u^2\frac{\partial \rho}{\partial P}\right) = \frac{1}{\rho u^2}\frac{dP}{dx}(1 - Ma^2) \quad (12)$$

Equations (11, 12) are a resultant of combining momentum and continuity, hence one can use equation (12) instead of Euler's equation.

The conservation of mass equation (5) in 1d, is $$\frac{\partial(A\rho\vec{v})}{\partial t} + \nabla \cdot A(\rho\vec{v} + \vec{j}_k) = \frac{\partial(A\rho_k u)}{\partial t} + \frac{\partial(A\rho_k u + j_k)}{\partial x} \quad (13)$$

$$= \frac{\partial}{\partial t}\left[A \times M_k \sum_{j=1}^{r} v_{kj}(\rho \bar{n}_j)\right]$$

With chemical reaction but otherwise stationary state this reduces to $$\frac{\partial(A\rho_k u + j_k)}{\partial x} = \frac{\partial}{\partial t}\left[A \times M_k \sum_{j=1}^{r} v_{kj}(\rho \bar{n}_j)\right] \quad (14)$$

Conservation of energy for a reversible flow (REC) (6) for 1d stationary-state with chemical reaction is $$\frac{\partial}{\partial x}\left(\rho\frac{1}{2}u^2 + \psi\right) + \left(\sum_{j=1}^{R}\sum_{k=1}^{K}\mu_k v_{kj}J_j - \rho\dot{Q}\right) = \quad (15)$$

$$-\left[\frac{\partial}{\partial x}(\rho(h - Ts)u - \sum \mu_k j_k)\right]$$

The geodesic equations (8,9) remain unchanged because they are in the thermodynamic space. Spatial coordinates are not normally known for a given plant. However for performance calculation these are irrelevant. One normalizes to an interval (−1;1). To solve the N+3 first order ODEs (12, 14, 15) and N Equations-of State in the 2N+3 functions $P(x)$, $T(x)$, $g(x)$, $\rho(x)$, $\rho_k(x)$, $\mu_k(x)$, $u(x)$.

To solve these equations, one needs to know the cross sectional area $A(x)$ for the reversible continuum. This is obtained by combining the system (12,14,15) and the N Equations-of-State together with the integral energy and mass balances of the actual (real, irreversible) continuum e.g. $\dot{M}\Delta h = \dot{W} + \dot{Q}$.

A delicate but important point to note here, is, that necessarily the mass-flow-rate is common to both the Masked (reversible) and actual continuum. The extra magnitude of work interaction manifests itself as differences in velocities only. Hence $\dot{M} = [A\rho u]_{Aent} = [A\rho u]_{Aexe}$, $\dot{W}$, $\dot{Q}$ are the actual magnitudes of work and heat interactions (load). $\Delta h$ are the given enthalpies difference at Aentex of the plant's continuums. The additional actual energy balance equation combines with (12,14,15) and Equations-of-State is well-posed in the 2N+3 unknown functions plus $A(x)$, which is then kept fixed through the iterations following the loop shown in FIG. 1.

By varying the initial conditions at Aent (x=−1) for first order ODEs (12,14,15) $P(x_0)$, $T(x_0)$, $g(x_0)$, $\rho(x_0)$, $\rho_k(x_0)$, $\mu_k(x_0)$, one obtains new values for the functions $P(x)$, $T(x)$, $g(x)$, $\rho(x)$, $\rho_k(x)$, $\mu_k(x)$, as well as for $u(x)$. In particular one obtains the values at Aex(x=1). These predictions are the essence of the mathematical model of a reversible continuum in 1d.

It follows therefore, that the state of the entire Masked (reversible) plant is determined by the values of the free Variables. These decide the initial conditions of the plant's terminal continuums Aent.

Solving the mathematical model for terminal continuums gives the state at their Aex, which, in turn, is the state of the next cascading continuum and so on until the functions of $P(x)$, $T(x)$, $g(x)$, $\rho(x)$, $\rho_k(x)$, $\mu_k(x)$, $u(x)$ are known for all continuums that make up the plant. That is, the state of the entire Masked (reversible) plant is deduced. If it so happens that one or more continuums are not included in the cascade, then either there are more free variables, or the excluded set of continuums is indifferent to the Variables.

It follows, that varying the free Variables yields a new state of the reversible plant, as one would expect from a mathematical model. Each iteration around the loop shown in FIG. 1 generates a new state of the reversible plant which yields a new value of maximum work—the objective function to be minimized.

The objective of maximizing η is equivalent to minimizing the sum of all plant's exergy-losses. These techniques focus on the more primitive concept of Maximum Work or maximum power. The very definition of losses is the Lost Work, i.e. the difference between the maximum power, (which corresponds to the rate of work delivered in a reversible plant), and the actual electrical power output.

Since the latter is predetermined, then minimizing the Reversible Work will minimize the losses.

The maximum rate of work delivered by the Masked (reversible) continuum, i.e. its Reversible Work, is the difference in kinetic energy at its Aent, Aex. That is $$\dot{W}_{rec} = \sum \int_{P(-1)}^{P(1)} \frac{1}{\rho} dP = \int_{-1}^{1} A\rho u \frac{1}{2} u^2 dx \tag{16}$$

where the summing up is over all continuums; the summation yields the reversible work of the entire plant. It is this sum which is the objective function to be minimized, which for given electrical load will minimize the plant's fuel flow-rate subject to the operational and environmental constraints.

The techniques and systems described above comprise 2 main parts:
1. The objective function to be minimized which is the rate of kinetic energy delivered by a reversible representation of the actual plant. This minimization is equivalent to minimization of thermodynamic losses.
2. An accurate mathematical model that accurately determines how variations in losses in one or more part(s) of the plant affect the rest of it. Such variations can, in turn, be caused by manipulating the Variables. The accuracy of the model is facilitated by the Reversible Energy Conservation equation or the Thermodynamic Geodesic Field equation, augmenting Euler's equations. It is in essence a mathematical model of the reversible plant which assumes the same thermodynamic values at each cross-section as the actual plant.

The accuracy of the mathematical model combined with the built-in constraints guarantees that the system-generated values for the η-maximising Variables are in fact attainable in practice.

The mathematical model can in fact simulate a real plant even though the equations as such correspond to a reversible process. There is no need for ad-hoc assumptions and empirically derived tabulated data other than thermodynamic properties of working fluids. The model is fast, light on computer resources, and universal.

Figure 2:
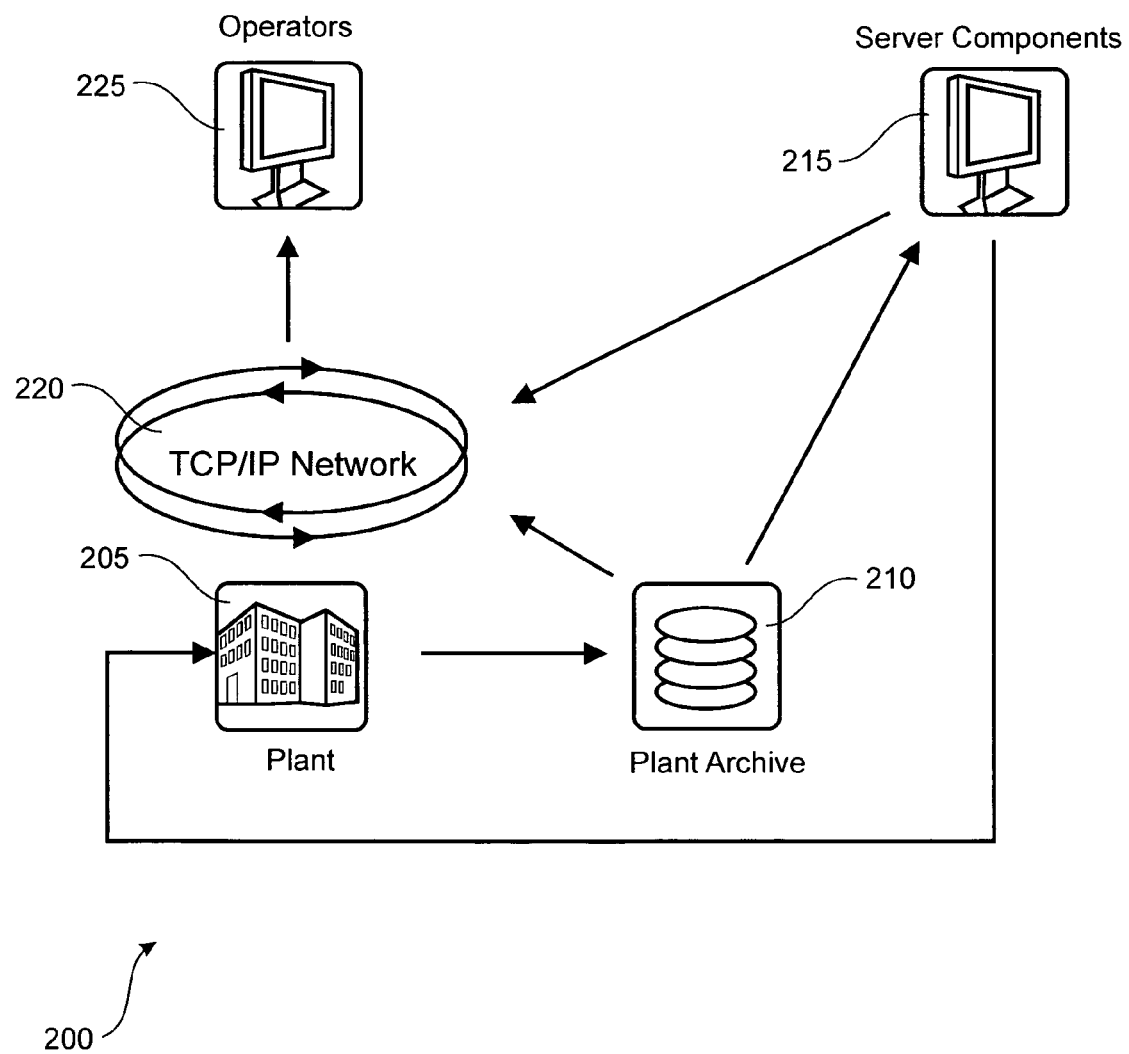
FIG. 2 shows one implementation of a technique for maximising thermal efficiency.

FIG. 2 shows at 200 one example of implementation of the techniques described above. Power plant 205 includes any one or more of a steam turbine, combined cycle, cogeneration power plant, diesel cycle, and nuclear.

Plant 205 has associated with it a plant archive 210. This plant archive is maintained in computer memory or secondary storage. The plant archive comprises time stamped efficiency data for some or all components of plant 205. The plant archive 210 is used to determine the current plant state.

A server configuration 215 carries out the functions described above performed by the solver 125 of FIG. 1. The server configuration 215 includes for example at least one display device, a processor, computer memory, and computer network components.

The results of analysing efficiencies can be displayed on display devices associated with the server configuration 215. The results can also be transmitted over a data network 220 to one or more client processing devices 225 operated by an operator. The results can be displayed on display devices associated with client device 225. The data can also be produced in hard copy on an associated printer device or saved in a data file on associated secondary storage.

A further embodiment of the system 200 transmits data from plant archive 210 to server configuration 215. The server 215 then automatically adjusts parameters of the plant 205 based on convergence calculations it has determined.

Figure 3:
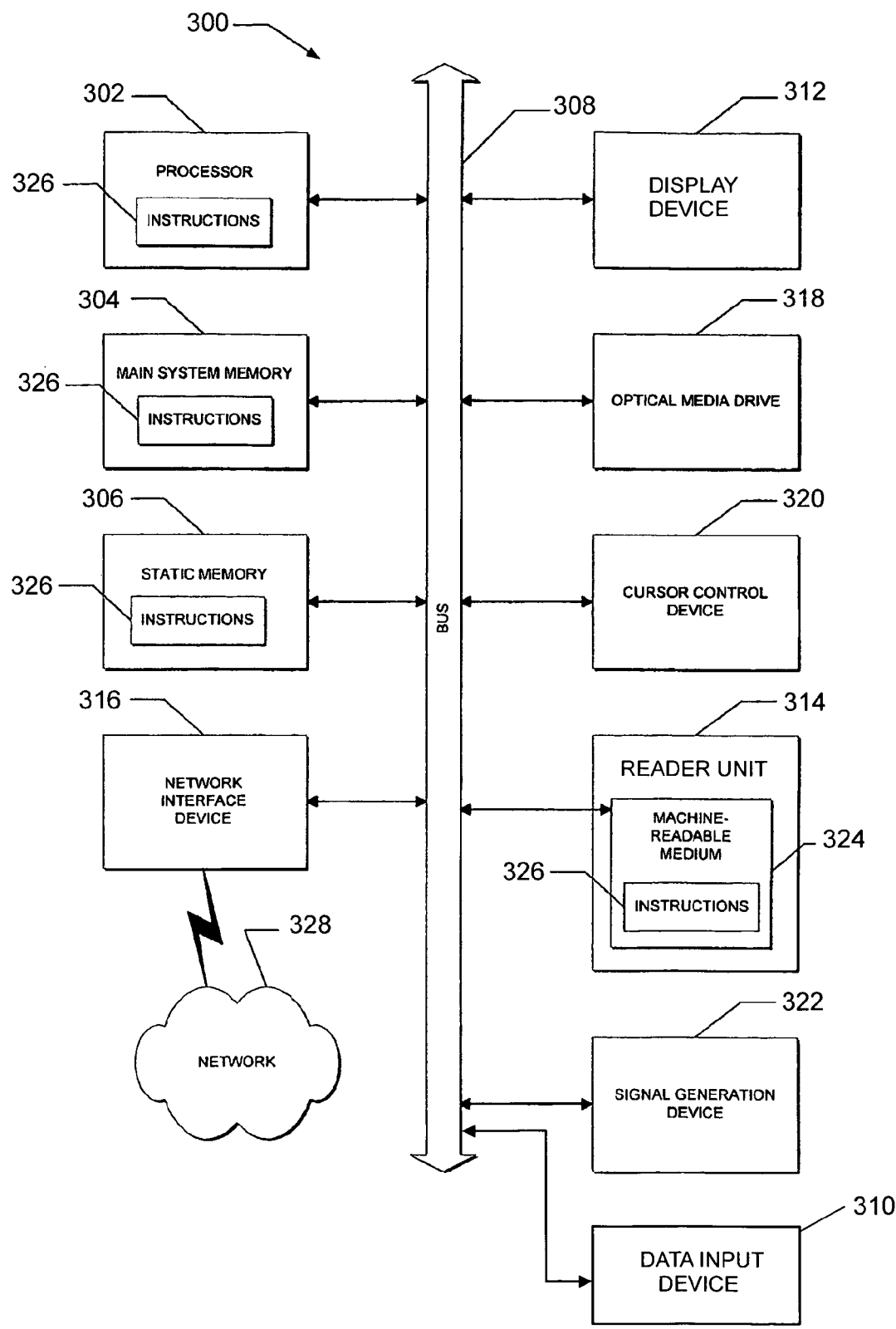
FIG. 3 shows a preferred form computing device.

FIG. 3 shows a simplified block diagram of a machine in the example form of a computing device 300. The server configuration 215 is one example of computing device 300. In one embodiment the server configuration 215 operates as a standalone computing device with network connections allowing it to access current values of client instrumentation. The server configuration 215 reports recommendations on both the device itself and via a network to other clients. In an alternative embodiment the techniques described above are executed entirely within a control system computing device associated with the plant 205.

Sets of computer executable instructions are executed within device 300 that cause the device 300 to perform the methods described above. Preferably the computing device 300 is connected to other devices. Where the device is networked to other devices, the device is configured to operate in the capacity of a server or a client machine in a server-client network environment. Alternatively the device can operate as a peer machine in a peer-to-peer or distributed network environment. The device may also include any other machine capable of executing a set of instructions that specify actions to be taken by that machine. These instructions can be sequential or otherwise.

A single device 300 is shown in FIG. 3. The term "computing device" also includes any collection of machines that individually or jointly execute a set or multiple sets of instructions to perform any one or more of the methods described above.

The example computing device 300 includes a processor 302. One example of a processor is a central processing unit or CPU. The device further includes main system memory 304 and static memory 306. The processor 302, main memory 304 and static memory 306 communicate with each other via data bus 308.

Computing device 300 further includes a data input device 310. In one embodiment the data input device includes a computer keyboard. The device 310 includes both a physical keyboard and/or a representation of a keyboard displayed on a touch sensitive display for example display device 312.

Computing device 300 may also include reader unit 314, network interface device 316, display device 312, optical media drive 318, cursor control device 320, and signal generation device 322.

Reader unit 314 is able to receive a machine readable medium 324 on which is stored one or more sets of instructions and data structures, for example computer software 326. The software 326 uses one or more of the methods or functions described above. Reader unit 314 includes a disc drive and/or a USB port. In these cases the machine readable medium includes a floppy disc and a static storage device such as a thumb drive. Where the optical media drive 318 is used, the machine readable medium includes a CD Rom.

Software 326 may also reside completely or at least partially within main system memory 304 and/or within processor 302 during execution by the computing device 300. In this case main memory 304 and processor 302 constitute machine-readable tangible storage media. Software 326 may further be transmitted or received over network 328 via network interface device 316. The data transfer uses any one of a number of well known transfer protocols. Once example is hypertext transfer protocol (http).

Machine-readable medium 324 is shown in an example embodiment to be a single medium. This term should however be taken to include a single medium or multiple media. Examples of multiple media include a centralised or distributed database and/or associated caches. These multiple media store the one or more sets of computer executable instructions. The term "machine readable medium" should also be taken to include any medium that is capable of storing, encoding or carrying a set of instructions for execution by the machine and that cause the machine to perform any one or more of the methods described above. The machine-readable medium is also capable of storing, encoding or carrying data structures used by or associated with these sets of instructions. The term "machine-readable medium" includes solid-state memories, optical media, magnetic media and carrier wave signals.

In one embodiment the software is installed and operating at a client site on a computing device 300. Network interface device 316 is required to communicate with an offsite central server for example to submit data results and license validations.

In some cases the network interface device 316 and network 328 are not required as the system can run in a stand alone mode. This means that no data results are submitted to the offsite central server.

The techniques described above have been tested on a power station in normal operating conditions. While the power plant was running at a constant power output, the instrument data was analysed by the invention and new recommendations for operating parameters measurements calculated. The plant operators then adjusted the plant parameters to these recommendations and efficiency was observed to improve.

Figure 4:
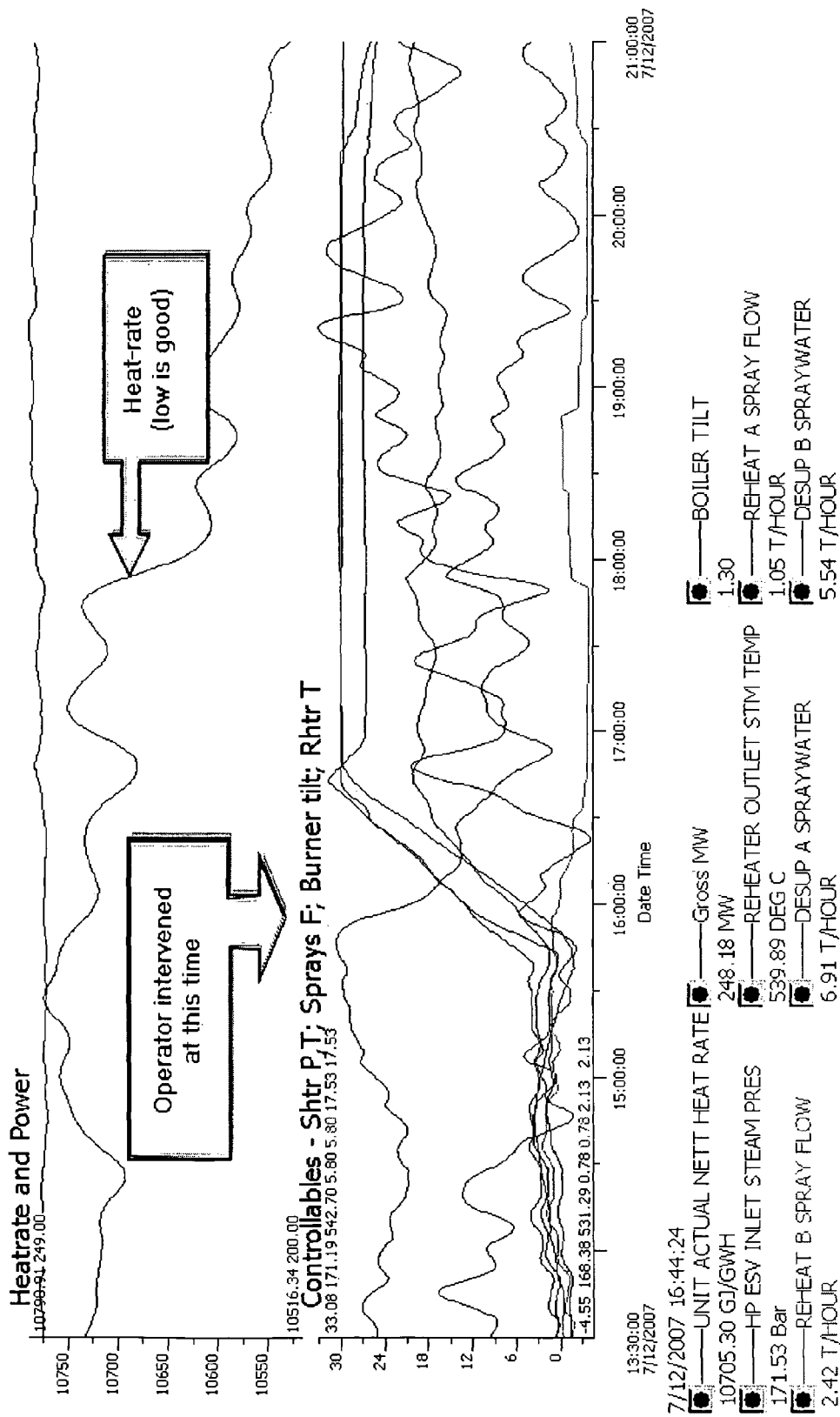
FIG. 4 shows the results of a first experiment.

FIG. 4 shows a first experiment run at a Huntly power station on 7 Dec. 2007 from 13:30 to 21:00.

The system described above recommended changes which required an operator to change attemperator flow-rates, main steam temperature, reheater temperature, and burner angle of tilting. Operator intervention began around 15:50. The heat rate was observed to improve or drop by close to 2%.

Figure 5:
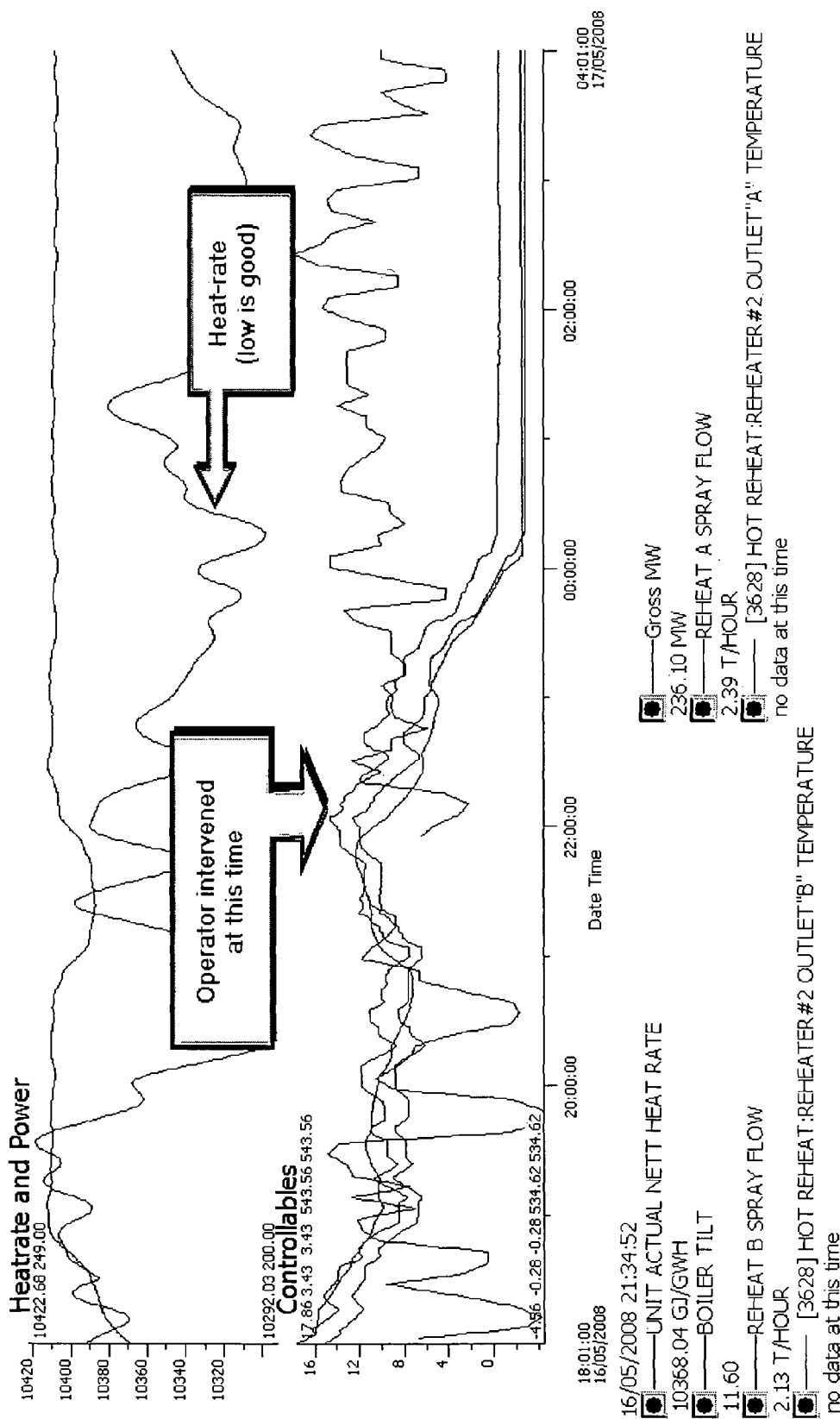
FIG. 5 shows the results of a second experiment.

FIG. 5 shows a second experiment that was run at the Huntly power station from 16 May 2008 starting at 18:00 to 17 May 2008 at 04:00.

The techniques described above recommended another combination of attemperator flow-rates, main steam and reheater temperature and the burner tilt angle.

Operator intervention commenced at 22:00 and heat-rate improvements of 1.5 to 2% were observed.

The techniques described above result in changes made to thermal efficiency of a power plant. In one embodiment the results of the equations above are applied manually to the plant by a user such as a plant operator. This is known as an open loop application. Alternatively the changes to the plant are applied automatically by a control system associated with the plant. This is known as a closed loop system.

The foregoing describes the invention including preferred forms thereof. Modifications and improvements as would be obvious to those skilled in the art are intended to be incorporated in the scope hereof, as defined by the accompanying claims.

The invention claimed is:

1. A computer implemented method of controlling any energy conversion plant, including power plants of all kinds, having a plurality of measured parameters that include one or more temperatures, pressures, partial pressures, mole numbers, flows, in and out electrical and/or mechanical powers, position of valves, and other actuators, the method maximizing thermal efficiency of the plant with respect to a subset of the measured parameters that can be manipulated, termed Variables, subject to operational, structural, financial, and environmental constraints, wherein the constrained maximization is called optimizing, wherein the computer is either an integral part of the a control system of the plant in that it reads measured parameters from a Data Acquisition System (DAS) and writes the Variables maximizing values into the control system as set-points in a closed loop optimization, or reads measured parameters from the DAS whilst human operators apply maximizing values of the Variables or modify the plant itself in an open loop optimization, comprising:

(1a) determining a set of [all relevant] measured thermodynamic properties throughout the plant and its Variables subset including those measured parameters that can be independently manipulated via an interface with the DAS, or via manual input;

(1b) deriving, from the measured parameters in accordance with (1a) and corresponding thermodynamic properties, a state of the plant that constitutes [all relevant] the set of measured thermodynamic properties throughout the plant, as well as energy mass and entropy flows, temperatures, pressures, partial pressures, mole numbers, liquid and gas flows and electrical input and output values, real velocity vector fields, by way of relevant balance equations and particular expressions;

(1c) from the derived plant state, partitioning the plant into a finite number of real irreversible physical continuums in accordance with continuum-mechanics, and which correspond to discontinuities of measured and derived parameters making up the derived state of the plant and satisfying conservation-of-mass condition(s);

(1d) constructing an isometric, in a thermodynamic metric, map in accordance with differential geometry of each real continuum established in (1c) from a thermodynamic manifold, which is spanned by thermodynamic coordinates and time, to a region of a Galilean manifold spanned by spatial and time coordinates;

(1e) constructing a plant model using the partitions into physical continuums determined in accordance with (1c) and in accordance with a physical real arrangement of actual hardware of the plant, as incedenting physical continuums, exhibited as a graph in accordance with graph theory, which can be reduced to a planar graph, wherein each boundary of a real continuum plays a role of an edge and each real continuum a role of a node;

(1f) converting each partitioned real, irreversible physical continuum into a virtual corresponding reversible continuum or Reversible Masking of the real continuum, subject to constraint(s) that each real continuum and corresponding reversible continuum assume same boundary values of thermodynamic properties in accordance with (1a) through (1e) and that their derivatives are continuous and equal at the boundaries, as well as mass-flow-rate, wherein the partitioned irreversible real continuums, which are governed by a system of conventional balance equations and constituent phenomenological equations, are converted into partitioned Reversible Maskings substitutes, which are governed by a system of partial differential equations excluding any constituent equations, but including either an equation of Thermodynamic Geodesic Field (TGF) in the thermodynamic metric or a direct Reversible Energy Conservation (REC), uniquely describing the reversible continuum (called a Mathematical Model of the reversible continuum), (1g) constructing an equivalent reversible virtual plant by mapping the partitioned Reversible Masking substitute equations from (1f) into the plant model constructed in (1e), such that the graph of (1e) is maintained, wherein the partition of a real plant of irreversible real physical continuums is mapped into a partition of Reversible Maskings substitute equations, with a same incidence matrix in accordance with the graph theory of (1e);

(1h) solving the mapped equations from (1g) for a current plant state in terms of velocity vector fields across the reversible continuums and storing the values of the solutions within the spaces defined by the reversible continuums;

(1i) constructing an objective function (called Loss) to be minimized by a surface integral of kinetic energy obtained from the velocity vector field(s) derived according to (1h) over the boundary of each Reversible Masking, inputting to a numerical integration the velocity field(s) and density field(s) of values at each? boundary according to (1e), outputting a difference in kinetic energy between boundaries where matter leaves and enters the Reversible Masking, subtracting, from the sum of all kinetic energy increment, actual work delivered by the real plant;

(1j) simulating the plant using the solved equations from (1g) using the constructed virtual reversible plant and adjusting the set-points of the control system in the simulation to determine the Variables defined in (1a) that correspond to minimization of the Loss constructed in (1i) resulting in maximizing efficiency of the plant according to a predetermined objective function; and (1k) applying the Variables derived according to (1j) that minimize the objective function constructed according to (1i) to the real thermal power plant.

2. A method for further generating a revised state of the plant and reversible velocity fields by varying a subset of the Variables defined in claim 1, based at least partly on an energy conversion plant configuration in accordance with (1e) of claim 1, superimposed by the Reversible Masking in accordance with (1f) of claim 1, and consequent reversible plant in accordance with (1g) of claim 1, further comprising:
    providing a solver configured to include:
        (2a) Euler's balance of momentum equation;
        (2b) the conservation of mass equation;
        (2c) the reversible conservation of energy (REC) equation;
        (2d) the thermodynamic equations of state; or
        (2e) the thermodynamic geodesic field (TGF) equations; and
        (2f) a numerical solution module to carry out the solving of the simultaneous equations (2a) to (2e) subject to revised boundary conditions based at least partly on Central Schemes methods, Method of Lines, or reduced versions thereof.

3. A computer readable medium storing data that flows from the numerical solution module defined in (2f) of claim 2, wherein the data provides a simulator that simulates thermodynamic properties of a real plant.

4. A method for deriving kinetic energy differences across each of the reversible continuums defined in (1f) of claim 1, comprising:
    feeding data from the data flow of the reversible velocity field(s) computed by a solver provided according to claim (2) into a module of numerical integration of kinetic energy around the surface of each reversible continuum to derive kinetic energy differences across each of the reversible continuums.

5. A method comprising:
    obtaining an objective function constituting a sum of all kinetic energy integrals of all Reversible Maskings defined according to (1f) of claim 1.

6. An apparatus comprising an energy conversion plant thermal efficiency constrained-maximization, wherein the apparatus is configured to implement the method of claim 1 to obtain a current state of the plant from available measured data, obtain a subset of Variables of the measured data, apply a set of constraints to the Variables, generate a revised state of a reversible power plant, wherein the reversible plant is generated according to (1g) of claim 1 as a function of a revised set of Variables, the generation based at least partly on a Mathematical Model of the reversible continuum or Reversible Masking according to (1f) of claim 1, and test the revised set of Variables for convergence, comprising:
    (6a) an interfacing module with a DAS or receiver of manual input to determine initial values of a set of [all relevant] measured thermodynamic properties throughout the plant in accordance with (1a) of claim 1, wherein the measured data and the Variables subset flow to computer readable media modules;
    (6b) a module that generates an initial state of the plant as defined in (1b) of claim 1, from the measured parameters received from the interfacing module or manual input and corresponding thermodynamic properties;
    (6c) a module that constructs a partition into physical continuums in accordance with (1c) of claim 1, based at least partly on checking each combination of boundary-surfaces of mass-flow entering a continuum against all combinations of boundary-surfaces of mass-flow leaving the same continuum for conservation of mass, wherein, as a result, each continuum is reduced to cylindrical symmetry, and wherein the plant can be exhibited as a planar graph in accordance with graph theory, wherein each boundary of an incedenting physical continuum plays a role of an edge, and wherein each physical continuum plays a role of a node, and wherein a resultant plant model is defined in accordance with (1e) of claim 1;
    (6d) a minimizer module that generates revised values of the set of Variables that are fed into the Mathematical Model of the reversible plant provided as a solver according to claim 2;
    (6e) a convergence tester module that can be part of the minimizer module, within which, the solver as configured according to claim 2, a simulator that stores data that simulates thermodynamic properties of a plant, and an objective function defined in accordance with claim 5, are applied in that order to the plant model of the module constructed according to (6c) and the revised set of Variables, and that performs a convergence test to determine whether a variance is reached that is less than a threshold variance, and, if the convergence test fails, then revised numerical values of the objective function and the Variables and state of the plant are stored in the simulator and are fed into the minimizer module to generate revised values of the set of Variables; and
    (6f) a module that repeatedly invokes the convergence test module to repeat the convergence test to generate yet another revised state of the plant and reversible velocity field and tests a resultant revised objective function and the revised set of Variables for a variance less than a threshold variance, until the convergence test completes, and, if a variance less than a threshold variance is reached, then physically applies continuously the revised set of Variables values generated as Optimizer output to the real energy conversion plant, by way of closed loop optimization or open loop optimization, resulting in minimizing the objective function and resulting in maximizing of thermal efficiency of the real plant, wherein, if one of the constraints to the Variables is a given power output, then the maximizing of thermal efficiency will manifest itself as minimizing fuel consumption, whilst if the fuel consumption is rather dictated as an external constraint, then the maximizing of thermal efficiency will manifest itself as maximizing of power output.

* * * * *

UNITED STATES PATENT AND TRADEMARK OFFICE
CERTIFICATE OF CORRECTION

| | |
|---|---|
| PATENT NO. | : 9,436,168 B2 |
| APPLICATION NO. | : 13/508719 |
| DATED | : September 6, 2016 |
| INVENTOR(S) | : Eli Yasni |

It is certified that error appears in the above-identified patent and that said Letters Patent is hereby corrected as shown below:

In The Claims

Column 16, line 5, in claim 1, remove the first occurrence of "the";

Column 16, line 13, in claim 1, remove "[all relevant]";

Column 16, line 20, in claim 1, remove "[all";

Column 16, line 21, in claim 1, remove "relevant]";

Column 18, line 18, in claim 6, remove "[all"; and

Column 18, line 19, in claim 6, remove "relevant]".

Signed and Sealed this
Eighth Day of November, 2016

Michelle K. Lee
*Director of the United States Patent and Trademark Office*